United States Patent [19]
Patel

[11] Patent Number: 5,809,526
[45] Date of Patent: Sep. 15, 1998

[54] DATA PROCESSING SYSTEM AND METHOD FOR SELECTIVE INVALIDATION OF OUTDATED LINES IN A SECOND LEVEL MEMORY IN RESPONSE TO A MEMORY REQUEST INITIATED BY A STORE OPERATION

[75] Inventor: Rajesh Bhikhubhai Patel, Austin, Tex.

[73] Assignees: International Business Machines Corporation, Armonk, N.Y.; Motorola, Inc., Schaumburg, Ill.

[21] Appl. No.: 740,368

[22] Filed: Oct. 28, 1996

[51] Int. Cl.$^6$ .............................. G06F 12/08; G06F 13/00
[52] U.S. Cl. .............................................. 711/122; 711/144
[58] Field of Search ................................. 711/122, 135, 711/144

[56] References Cited

U.S. PATENT DOCUMENTS

| | | | |
|---|---|---|---|
| 5,369,753 | 11/1994 | Tipley | 711/122 |
| 5,510,934 | 4/1996 | Brennan et al. | 711/122 |
| 5,530,832 | 6/1996 | So et al. | 711/122 |
| 5,564,035 | 10/1996 | Lai | 711/144 |
| 5,577,227 | 11/1996 | Finnell et al. | 711/122 |
| 5,584,013 | 12/1996 | Cheong et al. | 711/122 |

*Primary Examiner*—Glenn Gossage
*Attorney, Agent, or Firm*—Casimer K. Salys; Brian F. Russell; Andrew J. Dillon

[57] ABSTRACT

A method and system of enhancing memory performance in a data processing system are provided. The data processing system may include a processor having an on-board first-level cache, a second-level cache coupled to the processor, a system bus coupled to the processor, and a main memory coupled to the system bus. When a memory request is received for a cache line at the first-level cache, a determination is made if the memory request is initiated by a store operation. If the memory request results in a hit in the first-level cache and a determination is made that the memory request is store-initiated, a corresponding cache line in a second-level cache is invalidated. If the memory request results in a miss in the first-level cache, the memory request is sent to the second-level cache, and, if the memory request results in a hit in the second-level cache and the memory request is determined to be store-initiated, the resulting cache line is forwarded to the first-level cache and the resulting cache line in the second-level cache is invalidated.

5 Claims, 2 Drawing Sheets

DATA PROCESSING SYSTEM AND METHOD FOR SELECTIVE INVALIDATION OF OUTDATED LINES IN A SECOND LEVEL MEMORY IN RESPONSE TO A MEMORY REQUEST INITIATED BY A STORE OPERATION

BACKGROUND

1. Technical Field

The illustrative embodiment relates in general to improvements in cache memory management in a data processing system, and in particular to improvements in cache memory management in a data processing system through elimination of outdated cache lines in a second-level cache.

2. Description of the Related Art

A computer system typically includes an information processor coupled to a hierarchial storage system. The type of storage employed in each staging storage location relative to the processor is normally determined by balancing requirements for speed, capacity, and cost. A commonly employed memory hierarchy includes a direct-access storage device (DASD) for bulk storage, a Random Access Memory (RAM) for main memory, and a special, high-speed RAM memory known as cache for processor caching of data and code that were recently accessed or are located in nearby memory locations. The memory management system dynamically copies parts of memory within this hierarchy for addresses deemed most likely to be accessed soon.

Whenever the central processing unit (CPU) initiates a memory access, the storage system sends the physical address to the cache. The cache compares the physical address with all of its address tags in a tag memory to see if it holds a copy of the datum. If the operation is a read access and the cache holds the given datum, the cache reads the requested datum from its own high-speed RAM and delivers it to the CPU. This is a cache hit, and it is usually much faster than reading the same value directly from main memory. If the cache does not hold the datum, however, a cache miss occurs and the cache passes the address to the main-memory system to read the datum. When the datum arrives from the main memory, both the CPU and the cache receive a copy. If the request also misses in main memory, the necessary blocks are transferred from the disk to the main memory and to the cache. If the CPU subsequently accesses the same blocks, the request will receive a hit in the cache and the block or cache line will be transferred from the cache and not the main memory, resulting in substantially faster accesses.

Since the cache memory capacity is smaller than that of the main memory and disk drive, not all the data blocks that may be required by the CPU can always be stored in the cache. In order for a new block or cache line to be loaded when the cache is full, blocks must be removed, or cast-out, from the cache to make room for newly accessed data. A well known and commonly used cache replacement algorithm is a Least Recently Used (LRU) algorithm. According to the LRU algorithm, the block which has not been accessed in the cache for the longest period is selected as the least recently used block and is replaced by the new block.

The latest generation of personal computers typically utilize multi-level cache systems that divide the cache memory between an on-chip level-one (L1) processor cache, and a separate, discrete level-two (L2) cache to further enhance system performance. Both cache memories are high-speed Static-RAM. The smaller L1 cache is integrated within the processor integrated circuit, significantly increasing the access speed of cache memory. The L2 cache is larger, typically in the range of 500 kilobytes (KB) to one megabyte (MB), and increases performance by storing a larger block of data that includes the block of data stored in the L1 cache.

Such multi-level cache systems operate with what is known as strong inclusion or weak inclusion. Strong inclusion requires that the entire data set or block of memory contained in the L1 cache be a subset of the block of memory contained in the L2 cache and that any store to the L1 cache is also made in the L2 cache by a write-through operation. Weak inclusion requires that the L1 cache contain a subset of the block of memory in the L2 cache but that changes to the L1 cache are updated in the L2 cache periodically using a write-back operation.

One important function of the cache management system is the replacement of existing lines in the cache with new cache lines that are required by the processor. In a set-associative cache, only a given number of "ways" of the congruency class may be held in the cache, so that when the ways are full within the cache and a member of the class must be loaded into the cache, the cache management system will select one of the ways within the cache for replacement, typically using a LRU replacement scheme. For example, in an eight-way set-associative cache, only eight lines with a given index can be held in the cache. If a ninth cache line with the same index is required, it would replace one of the existing eight cache lines having that index.

If a cache line being loaded into the L1 cache replaces a modified cache line, the modified line is cast out to the L2 cache to be stored there. For every line fill to the L2 cache, any modified lines being replaced are cast out to main memory. Consequently, a cast out from the L1 cache to the L2 cache may cause a subsequent cast out from the L2 cache to main memory to make room for the cast out from the L1 cache. However, if the memory access is initiated in response to a store operation, a number of inefficiencies occur in this system. It would be desirable to provide a cache management system that eliminates these efficiencies, thereby enhancing memory performance.

SUMMARY

A method and system of enhancing memory performance in a data processing system are provided. When a memory request is received for a cache line at a first-level cache, a determination is made if the memory request is store-initiated. If the memory request results in a hit in the first-level cache and the memory request is determined to be store-initiated, a corresponding cache line in a second-level cache is invalidated. If the memory request results in a miss in the first-level cache, the memory request is sent to a second-level cache, and, if the memory request results in a hit in the second-level cache and the memory request is determined to be store-initiated, the resulting cache line is forwarded to the first-level cache and the resulting cache line in the second-level cache is invalidated. The above as well as additional objects, features, and advantages of the illustrative embodiment will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
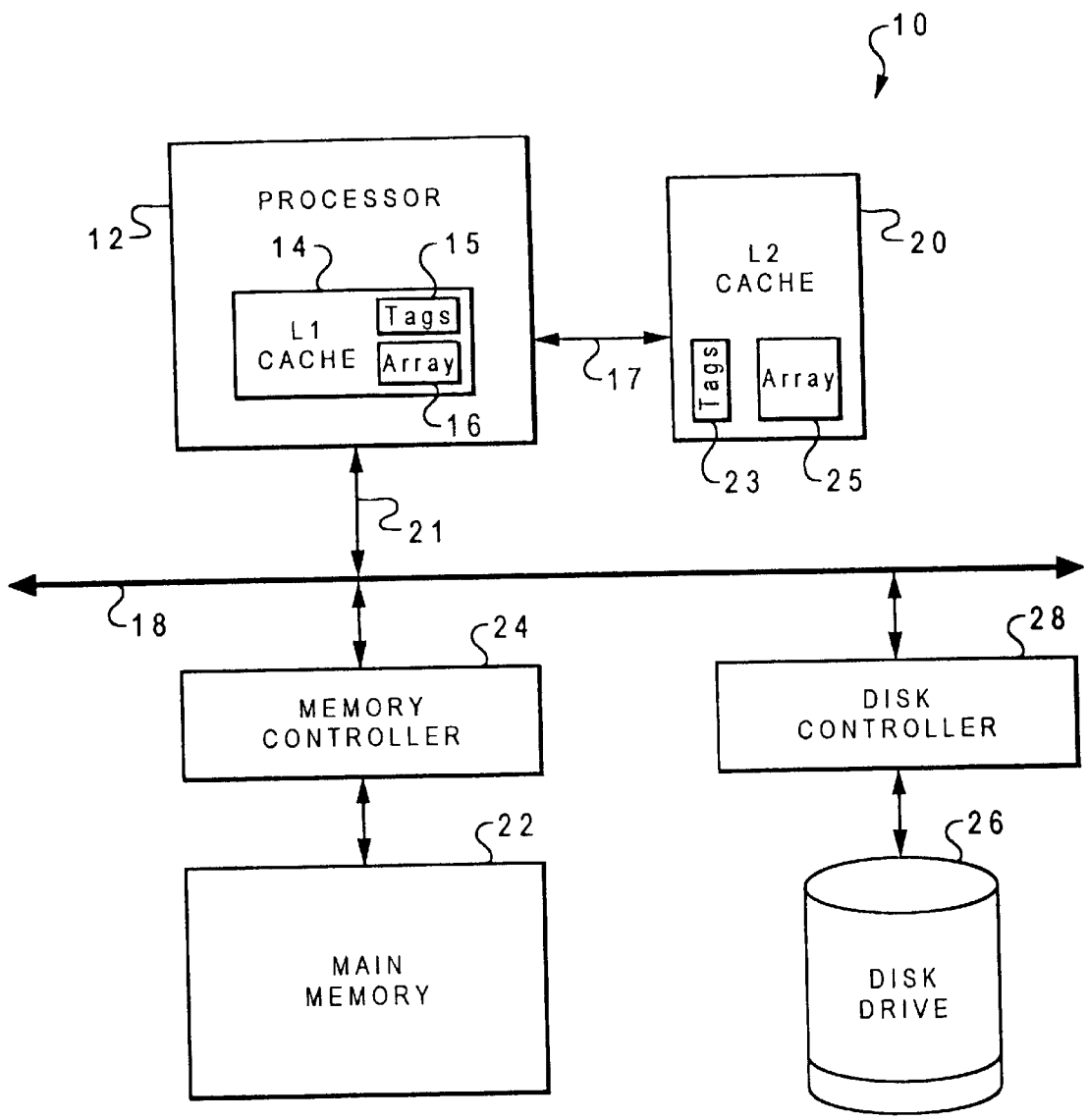
FIG. 1 illustrates a block diagram of a data processing system for processing information according to an illustrative embodiment.

With reference now to the figures and in particular with reference to FIG. 1, there is illustrated a block diagram of a data processing system, indicated generally at 10, for processing information according to a preferred embodiment of the present invention. In the depicted embodiment, data processing system 10 includes processor 12, which comprises a single integrated circuit superscalar microprocessor. Accordingly, processor 12 includes various execution units, registers, buffers, memories, and other functional units, which are all formed by integrated circuitry. In a preferred embodiment of the present invention, processor 12 comprises one of the PowerPC™ line of microprocessors produced by International Business Machines (IBM) Corporation of Armonk, N.Y., and Motorola, Inc. of Schaumburg, Ill., which operates according to reduced instruction set computing (RISC) techniques. (PowerPC™ is a trademark of IBM Corporation).

The system of FIG. 1 has a hierarchical memory configuration of a primary level (L1) cache, secondary level (L2) cache, main memory, and disk storage. Processor 12 includes an on-chip L1 cache 14 as the primary level cache. L1 cache 14 typically has a storage capacity in the range of 8 KB to 32 KB and, further, the components may be a single static random-access memory (SRAM) device or two physically separate devices within processor 12. A secondary cache, L2 cache 20, is connected to the processor 12 (at a bus interface unit not shown) by a local bus 17. L2 cache 20 is usually much larger than the primary on-chip cache, having a capacity in the range of 64 KB to 1 MB, but is much slower to access. In typical operation, L2 cache 20 contains a subset of the block of memory contained in main memory 22. In the same manner, L1 cache 14 contains a subset of the block of memory stored in L2 cache 20. The high speed L1 and L2 caches enable the processor to achieve relatively fast access time to a subset of data or instructions previously transferred from main memory to the high speed caches, thus improving the speed of operation of the data processing system.

Microprocessor level-one caches are often implemented as a "split-cache" with separate internal caches for caching instructions and data. A split-cache has a separate instruction cache (Icache) and data cache (Dcache), each having its own address and control ports. Such a configuration provides more efficient caching because the addressing of instructions tends to be much more serial than the addressing of data. By separating the caching functions for these two types of information, substantial efficiencies can be created by preventing the high input/output (I/O) of the data cache from interfering with the high locality of reference of instructions in the instruction cache. In order to exploit these advantages, as is commonly implemented in modern microprocessors, no sharing of these memory spaces may occur, and their functionality is defined distinctly and separately.

Processor 12 is coupled to system bus 18 by address and data lines 21. Main memory 22 is connected to system bus 18 through memory controller 24. Typically, main memory is implemented using random-access memories (RAMs) having a storage capacity of 1 MB to 64 MB. Mass storage is provided by direct access storage device (DASD) (Disk Drive) 26 coupled to the system bus 18 through a disk controller 28.

The transfer of operands or instructions between main storage and cache is usually effected in fixed-length units called blocks. A block of data may be transferred in varying sizes such as tracks, sectors, lines, bytes, etc., as are known in the art. However, both main memory and the cache's data array are typically divided into a number of cache lines whose sizes are all equal and generally contain a number of words ranging in size from between 4 and 64 bytes, and so blocks of one or more lines are usually transferred. Although a cache line is described herein as the unit of transfer, the present invention may be practiced with any size or type of data transfer unit.

Processor 12 issues memory requests to the multi-level storage system, which comprises L1 cache 14, L2 cache 20 and main memory 22. Processor 12 initiates the memory request by sending the physical address to L1 cache 14. The cache compares the physical address with all of its address tags to see if it holds a copy of the datum. All hits to cache lines in the L1 cache 14 (whether modified or clean) require no further processing by the L2 controller or the Bus Interface Unit (BIU) (not shown). L1 cache 14 misses, which are usually the result of instruction misses, data load or store misses, write-through operations, or cache management instructions, result in L2 cache requests. If the hit memory request hits in the L2 cache 20, the requested cache line is forwarded to the L1 cache 14 and made available to the processor. If the cache request misses in both the L1 cache 14 and the L2 cache 20, a memory request is made by the BIU for a "line fill" from main memory for the requested line. The requested line (often in a block transfer) is returned to the BIU from main memory, and the requested cache line is forwarded to both the L1 cache 14 and the L2 cache 20.

At a later time, memory access to a different cache line with the same index may occur at the L1 cache 14. If the previously forwarded cache line is replaced by the L1 cache controller (following the L1 LRU mechanism) to accommodate the latest memory request, the larger L2 cache 20 may still maintain the replaced cache line, thereby allowing the processor to have access to it by forwarding it to the L1 cache 14 when required.

If the main memory 22 does not contain the location for which a cache fill is attempted, then a page containing this data is accessed from disk storage 26, then the cache fill is completed and the memory access satisfied. The time required to acquire a page from disk 26 and write it to main memory 22 would be many thousands of CPU cycles, during which the CPU is ordinarily switched to do another task, or stalled, waiting for the data to satisfy the request. For optimum performance, the object is for the caches 14 and 20 to contain the data most likely to be used next, and, based upon the principles of locality and immediacy, this is approximated by maintaining data in cache that is used more recently by the tasks executing on the CPU.

Cache memories use different mapping techniques for mapping main memory addresses into its own local addresses. A set-associative cache organizes both main memory and cache memory into columns of N refill lines or cache lines. The cache can map refill line / from any column in main memory into a refill line / of any column in its own RAM data array. Data stored within memory is mapped into a cache line utilizing an index portion of the memory address, which typically is formed by a number of lower-significant bits of the address, such that multiple memory addresses having the same index map to the same set of cache lines in the cache. Cached data associated with a particular memory address is distinguished from data associated with other addresses having the same index (i.e., addresses within the same congruence class) by an address tag, typically the high-order address bits, stored in a cache tag memory in association with the cached data. The tag address of each cache line contained in the data array is stored in the tag memory along with state information such as the validity status.

An N-way set-associative cache maps memory locations to a set of cache lines at a particular index. Each index forms a congruence class of addresses within memory that share that index. However, the number of columns or "ways" of the cache (i.e. the number of members of the congruence class that may be held in the cache at a given time) is limited by the size of the cache, and so there are less ways than the number of members in the class. Thus, an N-way set-associative cache maps each memory location (cache line) into any of N memory locations (cache lines) at a given index in the cache, where N is the number of ways maintained by the cache for each congruence class.

The cache controller function of processor 12 or dedicated cache controller hardware determines if the received memory request is a load request or a store request.

According to the illustrative embodiment, the cache management system for the data processing system improves the efficiency of the L2 cache 20 by eliminating a certain class of outdated cache lines in the L2 cache 20 during the processing of a store-initiated cache access. When a hit occurs in the L1 cache tags 15 for a store-initiated cache access, the store is performed on the cache line in the L1 cache array 16 and the cache line is marked modified. Simultaneously, or thereafter, a lookup is initiated in the L2 cache tags 23 for the cache line and the cache line is invalidated in the L2 cache array 25. Memory performance is thereby enhanced by eliminating this outdated, and therefore unnecessary, cache line in the L2 cache 20. As will be appreciated, an extra tag (way) is thereby freed up in the L2 cache 20. This will allow an additional valid cache line to be brought into the L2 cache 20 that may be subsequently accessed by the processor. The placement of this cache line in the L2 cache 20 decreases the memory access lag for this cache line. Also, a problem with the prior art is prevented, where a replacement of this indexed cache line (due to the L2 LRU mechanism) could result in up to four cache lines being cast out to the main memory depending on how many of the four sectors associated with the index of the cache line are valid and modified.

If a store-initiated cache access misses in the L1 cache tags 15, an L2 cache lookup is performed in the L2 cache tags 23 to determine if the cache line is present in the L2 cache 20. If the L2 cache tags 23 respond with a hit, the cache line is forwarded from the L2 cache 20 to the L1 cache 14, where the store is performed on the cache line in the L1 cache and the line is marked modified. Again, the cache line present in the L2 cache 20 is now outdated, and the cache management system invalidates this outdated cache line from the L2 cache 20. As will be appreciated, the system eliminates the need to maintain the address space in the L2 for cache lines that are "dirty" in the L1.

Figure 2:
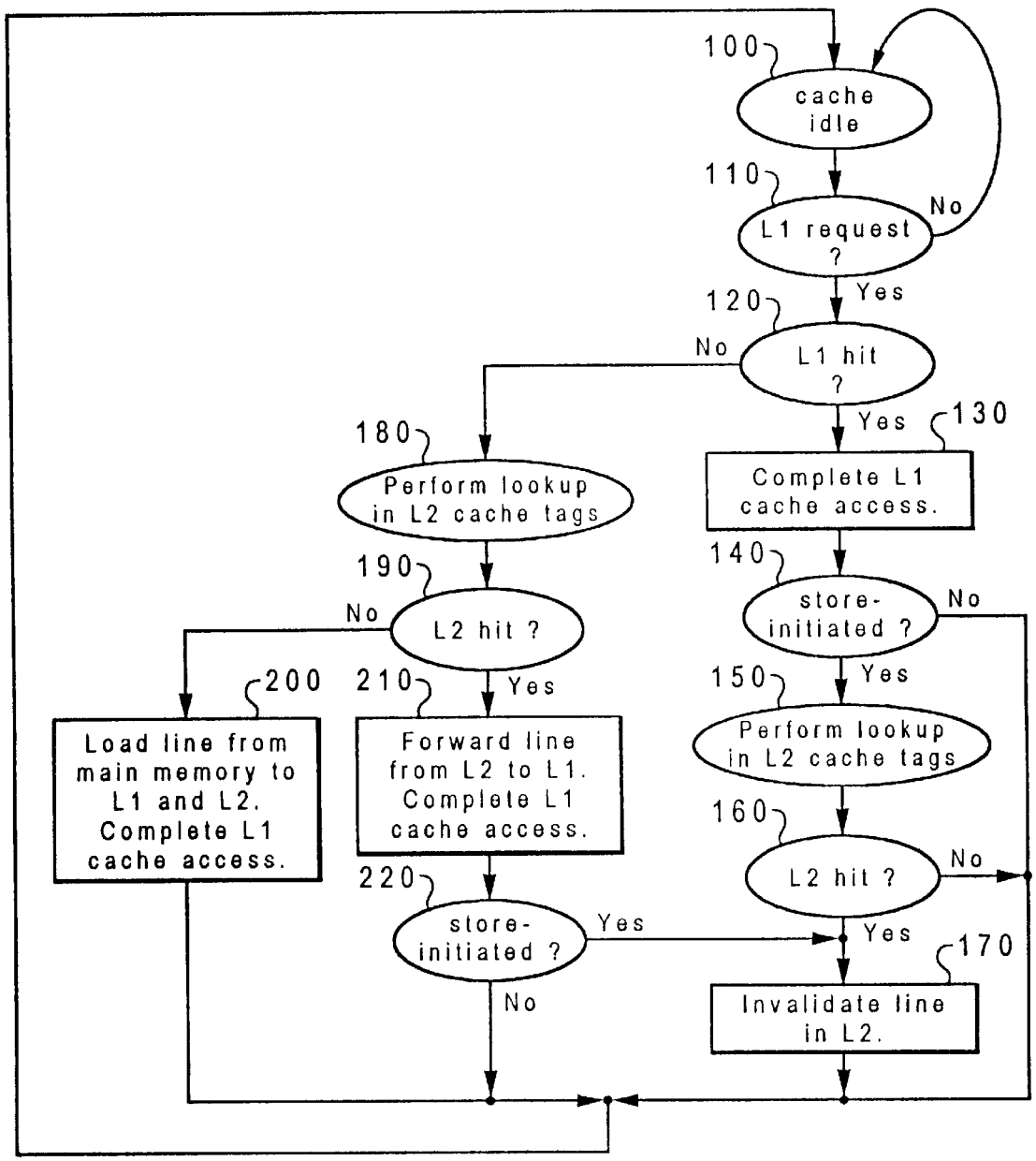
FIG. 2 shows a flow diagram of a method of enhancing memory performance in a processor by eliminating outdated cache lines in the second level cache according to the illustrative embodiment.

Referring now to FIG. 2, there is shown a flow diagram of the method of enhancing memory performance in a processor by eliminating outdated cache lines in the second level cache. At step 100, the cache management system is idle, awaiting a memory request for a cache line. At decision block 110, it is determined whether a memory request for a cache line has been received from the processor's load/store unit or instruction fetcher. If a memory request has not been received, the cache management system remains idle at step 100. If a memory request for a cache line is received, the method proceeds to decision block 120 where an L1 lookup is performed in the L1 cache tags 15 to determine if there is an L1 hit. If the memory request hits in the L1 cache tags, the process proceeds to step 130 where the L1 cache access is completed by returning the requested cache line to the requesting device.

It is then determined at decision block 140 whether the memory request was a store-initiated or load-initiated memory request. If the memory request is not a store-initiated access, the method returns to step 100. If the memory access is store-initiated, the method proceeds to step 150 where the memory request is processed in the L2 cache 20 by performing a lookup in the L2 cache tags 23. At step 160, it is determined whether the memory request hits in the L2 cache tags 23. If the cache management system does not maintain an inclusive set of data in the L2 cache 20 and the cache line is not contained in the L2 cache 20, the cache line will not hit in the L2 cache tags 23 and the process will return to step 100. If the cache line hits in the L2 cache tags 23, the cache line is invalidated in the L2 cache 20 at step 170, and the method returns to step 100.

If the cache line from the memory request does not hit in the L2 cache tags 23, the method proceeds to step 180 from decision block 120. A lookup for the cache line is performed in the L2 cache tags 23 at step 180, and a determination is made whether an L2 hit occurs for the cache line at decision block 190. If a hit does not occur in the L2 cache tags 23 at step 190, the cache line is loaded from main memory to both the L1 cache 14 and the L2 cache 20, and the L1 cache 14 access is completed at step 200. The method then returns to step 100.

If the lookup in the L2 cache tags 23 at step 190 results in a hit, the method proceeds to step 210 where the required cache line is forwarded from the L2 cache 20 to the L1 cache 14 and the memory access is completed from the L1 cache 14. Thereafter, it is then determined whether the original memory request was store-initiated at decision block 220. If the original memory request was store-initiated, the process proceeds to step 170 where the cache line is invalidated in the L2 cache 20. If the memory request was not store-initiated, as determined at decision block 220 or after the cache line has been invalidated in the L2 cache 20 at step 170, the process returns to step 100.

While an illustrative embodiment has been particularly shown and described, it will be understood by those skilled in the art that various changes in form and detail may be made therein without departing from the spirit and scope of the invention.

What is claimed is:

1. A method of enhancing memory performance in a data processing system, comprising:

receiving a memory request for a cache line at a first-level memory;

determining if the memory request is store-initiated; and if the memory request results in a hit in the first-level memory and the memory request is determined to be store-initiated, invalidating a corresponding cache line in a second-level memory.

2. A method according to claim 1, wherein the memory request is generated by a processor.

3. A data processing system, comprising:
a processor that issues memory requests;
a multi-level storage system including a first-level memory, a second-level memory, the multi-level storage system being connected to the processor to service issued memory requests; and
a cache controller that receives a memory request by the processor for a cache line and, if the memory request is store-initiated and results in a hit in the first-level memory, invalidates the cache line in the second-level memory.

4. A data processing system according to claim 3, wherein the first-level memory is a first-level cache.

5. A data processing system according to claim 3, wherein the second-level memory is a second-level cache.

* * * * *

UNITED STATES PATENT AND TRADEMARK OFFICE
CERTIFICATE OF CORRECTION

PATENT NO. : 5,809,526
DATED : September 15, 1998
INVENTOR(S) : Patel

It is certified that error appears in the above-identified patent and that said Letters Patent is hereby corrected as shown below:

Column 4, Line 30: Please delete "hit"

Column 4, Line 58: Please replace "this" with --the data most likely to be used--

Signed and Sealed this

Twentieth Day of April, 1999

Attest:

Q. TODD DICKINSON

*Attesting Officer*      *Acting Commissioner of Patents and Trademarks*